Dec. 17, 1968     J. E. P. PICKETT     3,416,853
PNEUMATIC APPARATUS FOR VIEWING FILM-MOUNTED SPECIMENS
Filed Aug. 15, 1966     2 Sheets-Sheet 1

*INVENTOR.*
John E. P. Pickett

BY
B. B. Olive
J. Bowen Ross, Jr.
ATTORNEYS

Dec. 17, 1968     J. E. P. PICKETT     3,416,853
PNEUMATIC APPARATUS FOR VIEWING FILM-MOUNTED SPECIMENS
Filed Aug. 15, 1966     2 Sheets-Sheet 2

*INVENTOR.*
John E. P. Pickett

BY  B. B. Olive
    J. Bowen Ross, Jr.
    ATTORNEYS

United States Patent Office 3,416,853
Patented Dec. 17, 1968

3,416,853
PNEUMATIC APPARATUS FOR VIEWING
FILM-MOUNTED SPECIMENS
John E. P. Pickett, 3323 Pinafore Drive,
Durham, N.C. 27705
Filed Aug. 15, 1966, Ser. No. 572,478
7 Claims. (Cl. 350—92)

ABSTRACT OF THE DISCLOSURE

A microscope attachment for supporting a pair of film strip reels and for viewing an associated film strip mounting histology specimen's incorporates a bent sheet support and on such support a pivoted cover glass and in each reel handle a pneumatic lift device allowing remote lifting of the cover glass between movements of the film.

---

This invention relates to an apparatus for handling film which mount histological specimens and, more particularly, to an apparatus which is adapted to be mounted on the stage of a standard microscope for moving a film strip mounting histological specimens, relative the lens of the microscope so that selected specimens may be observed.

For many years, histological specimens were mounted on individual glass microscopic slides which were normally stored in shock resistant boxes. The use of individual glass slides is not completely satisfactory for the slides are easily broken even when due care is used and they have the tendency to become disarranged in the boxes. The breakage and disarrangement problems were substantially solved by placing the histological sections on a plastic film strip of approximately thirty-five millimeters in width as described in my co-pending application entitled "Film Strip Apparatus and Method for Handling Histological Sections" filed June 4, 1965, Serial No. 461,440.

A length of film having received the various histological tissue sections is placed on a reel substantially as shown and described in an article entitled "A Device for Viewing 35 mm. Film-Mounted Specimens," The American Journal of Clinical Pathology, vol. 45, No. 4, page 480. A device of this nature is entirely satisfactory for handling short lengths of film; however, it is quite common to cut hundreds of sections from a single tissue sample and it would be desirable to mount all of the same in sequence on one strip of film. It can be seen that devices of the prior art not adapted to handle film strips of great length.

High powered microscopes which are generally used as the means for observing the histological tissue sections are manufactured with a built-in correction factor to take account for the distortion produced by the cover glass of the prior art. Therefore, to eliminate distortion, a cover glass must be used since substantially all microscopes have been corrected to account for the distortion produced by the cover glass. The use of a cover glass in combination with a plastic film mounting histological sections is to date not feasible for the upper surface of the plastic film strip which mounts the histological section is covered with a thin plastic and the movement of the film strip past a cover glass while touching the same would scratch and deface the plastic cover and render the film strip unfit for microscopic viewing. Continuous scratching of the film strip would eventually cause damage to the histological specimens.

A system whereby a standard microscope and cover glass can be used in combination with the plastic film strip is desired by those pathology and histopathology departments of medical and veterinary institutions.

It is therefore an object of this invention to provide an apparatus for handling film mounted specimens which can be adjustably mounted on the stage of already available microscopes and used in combination therewith.

Another object of the present invention is to provide an apparatus which utilizes the film strip and cover glass technique but which is not limited to either a single width of film or to relatively short lengths of film.

A further object is to provide an apparatus for handling film mounted specimens which is adapted to move the specimen in any planar direction while beneath the cover glass when the apparatus is placed on the stage of a standard microscope.

Other objects and advantages of the invention will become apparent from the following description and claims, and from the accompanying drawings, wherein:

One embodiment of this invention contemplates using a rectangular table as a surface for supporting a film strip mounting a plurality of tissue specimens. The table is adjustably mounted on the stage of a microscope and is provided with an opening which is to be positioned beneath the lens of the microscope and with a pair of downwardly and outwardly sloping end walls each of which is adapted to receive a film winding apparatus which rotatably mounts a film reel. The reels are adapted to receive a length of film which extends in a defined path between the same, across the table and under the lens of the microscope. In the area between the lens and film, the table is provided with a cover glass which has one end pivotally mounted thereon. The cover glass has its other end positioned over a pneumatically operated shaft which, when extended, pivots the cover glass upwardly through a given arc. The shaft is received by a pneumatic cylinder which is connected by separate tubes to two pneumatic pressure sources. The pressure sources comprise the handle portions of the film winding apparatus. Thus, when an operator grasps and turns the handle portion of either reel apparatus, air is forced from the same and into the pneumatic cylinder which forces the shaft outwardly and pivots the glass slide. Upon the upward pivot of the glass slide, the film is free to move across the table and under the same without being scratched or damaged. To move the film in the direction which is perpendicular to the path as defined by it, the table is mounted on the stage by means of an adjustable locking mechanism. The locking mechanism is actuated by turning a handle which rotates a screw and causes the table to move in one direction relative the stage.

Figure 1:
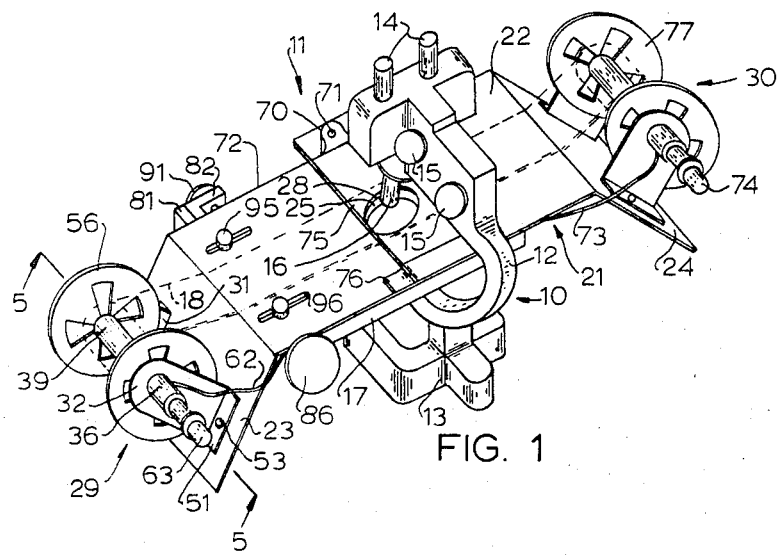
FIGURE 1 is a perspective view of an apparatus for handling film mounted specimens constructed in accordance with the present invention showing the same mounted on the stage of a standard microscope.
Figure 2:
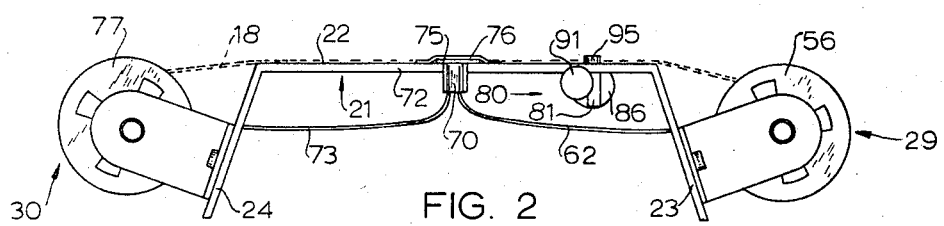
FIGURE 2 is a side elevational view of the apparatus illustrated in FIGURE 1 but with the microscope removed.

Referring to FIGURE 1, a microscope 10 which supports a film strip handling apparatus 11 of this invention consists generally of a pedestal 12 mounted on a base 13. Microscope 10 is also provided with a pair of eyepieces 14, focusing adjustments 15, lenses 16 and a stage 17 upon which film strip handling apparatus 11 is adjustably mounted.

Handling apparatus 11 is adaped to hold as many standard microscopic sections as can be mounted in a side-by-side relationship on film strip 18. Film strip handling apparatus 11 has a rectangular shaped table 21 which is constructed of a durable, light-weight metal, such as aluminum or any other suitable material, which can be readily stamped from sheets of material and easily bent into the required form. Rectangular table 21 comprises a top portion 22 which is adjustably mounted on stage 17 of microscope 10 by means of locking mechanism 80 and a pair of downwardly and outwardly sloping integral end support members 23 and 24. Stage 17 has an opening 25 which allows light reflected by the microscope mirror or light (not shown) to penetrate the film 18 which extends across the same. Table 21 has a corresponding opening 28 which when aligned with opening 25 permits the film mounted histological specimen to be observed. Rectangular shaped table 21 has adjustably mounted on its downwardly and outwardly sloping end support members 23 and 24 reel supports 29 and 30, respectively. Only reel support 29 will be discussed in detail since members 29 and 30 are identical in construction.

Figure 5:
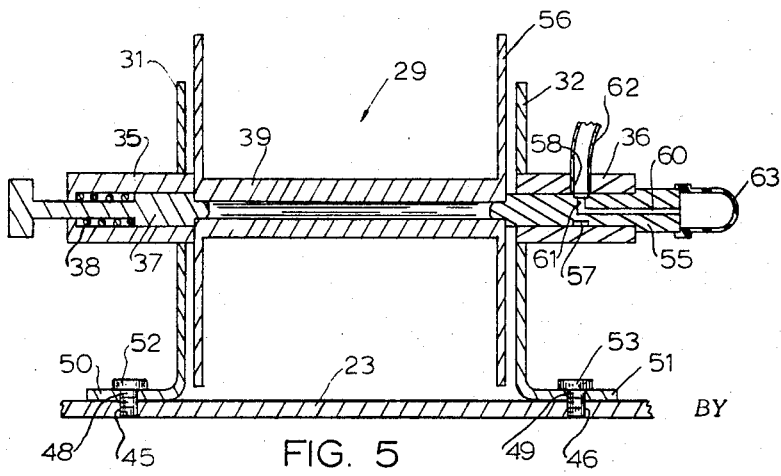
FIGURE 5 is an enlarged sectional view taken along line 5—5 of FIGURE 1 showing the reel support mechanism.
Figure 3:
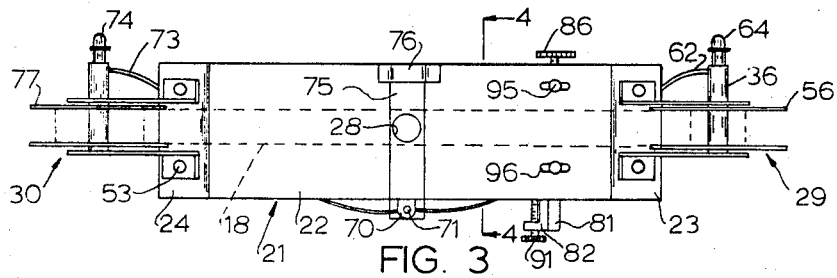
FIGURE 3 is a plan view of the apparatus showing the direction of the film across the rectangular table.

Referring to FIGURE 5, reel support 29 comprises a pair of outwardly facing, L-shaped, upright members 31 and 32. End support member 23 has a pair of threaded holes 45 and 46 and L-shaped, upright members 31 and 32 have holes 48 and 49, respectively, which are adapted to be centered over holes 45 and 46. A pair of knurled locking screws 52 and 53 extend through holes 48 and 49 and are threadably received by threaded holes 45 and 46, which are located in end support member 23, to secure L-shaped members 31 and 32 to the end support member 23. A pair of tubular stud members 35 and 36 are respectively made integral with members 31 and 32, respectively. Stud member 35 is equipped with a slidably mounted shaft 37 which is spring loaded by means of spring 38 within stud 35. Shaft 37 is adapted to be slid outwardly a distance in stud 35 so as to release an engaged reel 56 and, also, to adapt reel support 29 to receive reels of various widths. Upon release of shaft 37, spring 38 forces shaft 37 into a mating relationship with hollow reel cylinder 39. Reel member 32 also has a shaft 55 rotatably mounted within stud 36 which frictionally engages reel 56 and working in conjunction with shaft 37 supports reel 56. Shaft 55 is provided with an axially aligned recess 60, a circumferentially arranged groove 57 and a bore 61 which is perpendicular to recess 60 and which pneumatically connects recess 60 with groove 57. Groove 57 is in pneumatic communication with an opening 58 in stud 36 which is connected to flexible tube 62. Shaft 55 has mounted on its outer end a flexible hollow nipple 63 which is in pneumatic communication with recess 60 whereby upon the application of pressure on nipple 63, air is forced into the flexible tube 62 through bore 61, groove 57 and opening 58. Flexible tube 62 extends from bore 61 of reel support member 29 to a pneumatic cylinder 70 and piston 71 which is fastened to table 21 along its outer edge 72 by any suitable means (such as a weld). Cylinder 70 is mounted parallel with and directly opposite opening 28. Another flexible tube 73 identical in construction and operation to tube 62 connects reel support member 30 with cylinder 70. Tubes 62 and 73 are connected to cylinder 70 so that once nipples 63 or 74 are depressed, piston 71 will be extended upwardly and upon the release of nipples 63 or 74, piston 71 will seat itself within cylinder 70. Thus, upon grasping nipples 63 or 74, piston 71 is extended upwardly and the respective reel is adapted to be rotated by the turning of the nipple.

A thin cover glass 75 extends from the side of table 21 adjacent pedestal 12 of microscope 10 across opening 28 and rests above pneumatic cylinder 70. Cover glass 75 is pivotally fastened to table 21 by a strip of tape 76, or any other suitable means, so that once nipples 63 or 74 have been depressed and piston 71 is extended, cover glass 75 will be pivoted through a given arc about its pivoting point.

Film supply reel 56 which is mounted on reel support member 29 feeds film 18 across the length of table 21 onto take-up reel 77 mounted on reel support member 30. Film 18 is then adapted to pass over opening 28 and beneath cover glass 75. It can now be seen that cover glass 75 holds the film 18 in place for viewing when it is resting on table 21. Once nipples 63 or 74 have been depressed thus forcing air through tubes 62 or 73, cylinder 71 is extended thereby raising cover glass 75. Reels 56 and 77 are adapted to feed the film from that reel to the other depending upon the direction desired by simply rotating nipples 63 or 74 which in turn causes reels 56 or 77, respectively, to revolve.

Figure 6:
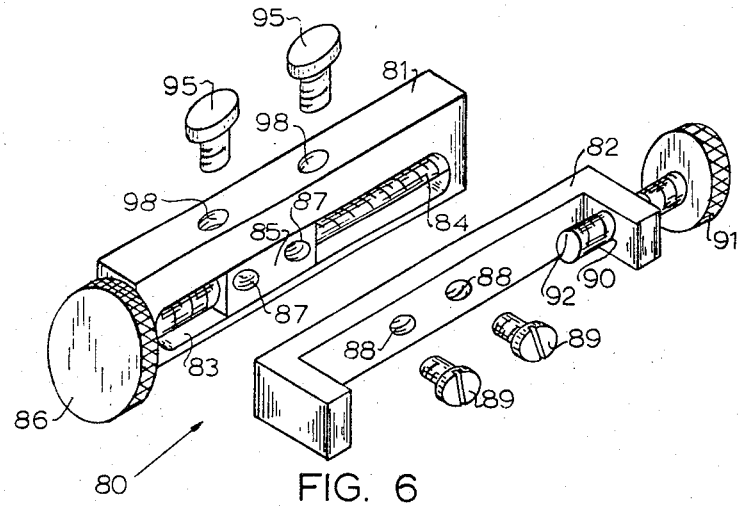
FIGURE 6 is an exploded pictorial view of the means for adjustably mounting the apparatus on the stage of a microscope.
Figure 4:
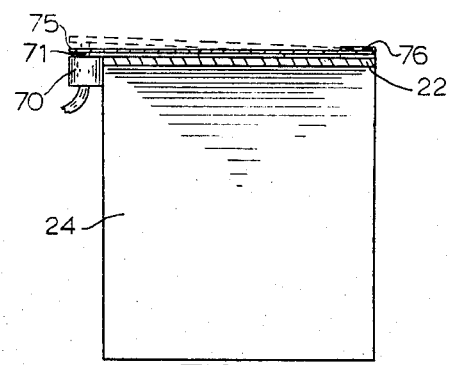
FIGURE 4 is a sectional elevational view taken along line 4—4 of FIGURE 3 showing the cover glass pivoting means.

Referring to FIGURE 6, a mechanism for adjustably locking the film viewing apparatus 11 to stage 17 will be described in detail. The locking mechanism 80 consists of a rectangular bar 81 and a substantially U-shaped member 82 being somewhat longer in length and smaller in width than bar 81. U-shaped member 82 is wide enough to receive a standard microscope stage between its leg members. Bar 81 has a groove 83 cut therein and rotatably receives a rod 84 which extends the length of groove 83 and which is threaded in the portions residing in groove 83. Rod 84 is mounted in bar 81 so that it may be rotated without being withdrawn therefrom. A block member 85 is threadably mounted on rod 84 and within groove 83 so that when rod 84 is rotated block 85 will travel the length of groove 83. It can be seen that rod 84 and groove 83 provide a track for supporting and guiding block 85. Rod 84 has a knurled knob 86 on its exterior end for convenience in rotating the same. Block 85 has a pair of threaded holes 87 which are adapted to be aligned with a pair of holes 88 in U-shaped member 82 and a pair of screws 89 which secure U-shaped member 82 to block 85 by extending through holes 88 and threadably engaging holes 87. U-shaped member 82 has a threaded hole 90 located in one of its legs which threadably receives a threaded shaft 92 which is provided with an integral knurled knob 91. Shaft 92 is adapted to be tightened against microscope stage 17 upon rotation of knob 91 thus locking U-shaped member 82 on the same. The complete locking mechanism 80 is assembled to table 21 by a pair of screws 95 which passes through slots 96 in table 21 and tighten into threaded opening 98 of bar member 81. By rotating knob 86, the film handling apparatus can be moved in and out relative to the microscope to allow for centering of the film mounted specimen over opening 28.

In operation, film viewing apparatus 11 is mounted on microscope stage 17 and is locked in position once shaft 92 is tightened against stage 17. Stage 17 cannot move within U-shaped member 82. Take-up reel 77 is mounted on reel support member 30 and the film supply reel 56 is mounted on reel support 29 so that film strip 18 having histological speciments mounted thereon can be fed across table 21. The film strip is passed beneath cover glass 75 and onto take-up reel 77. By squeezing and rotating nipple 74, cover glass 75 is pivoted clear of film 18 and film 18 is pulled over opening 28. Once the desired film section is positioned over opening 28, nipple 74 is released and cover glass 75 rests upon film 18 and presses portions of the same against table 21. The film section may now be viewed through eyepieces 14. The process is repeated for observation of the remaining film mounted sections. The direction of travel of film 18 may be reversed at any time as desired by squeezing nipple 63 and rotating the same in the opposite direction. Once a selected tissue specimen has been positioned under lens 16 of microscope 10, it may be moved in any planar direction as desired for a complete examination or the same by rotating knob 91 in the desired direction which moves the tissue specimen in or out small distances and by rotating reel 77 to the left or reel 56 to the right small distances.

While not described in the detailed description, it is contemplated that a small electric motor may be mounted on each downwardly extending side 23 and 24. The electric motors are connected to reels 56 and 77 and, upon the energization of each, are adapted to drive reel 56 in a counter clockwise direction and reel 77 in a clockwise direction, respectively. Each motor is adapted to be free wheeling when not energized. The motors may be controlled by a foot pedal whereby when one side of the foot pedal is pressed, the appropriate motor is energized and pulls the film in that desired direction; likewise, when the other side of the foot pedal is pressed, the other motor is energized causing the reel connected thereto to wind the film in the reverse direction. In order to pivot cover glass 75 upwardly, a solenoid valve may be incorporated into the circuit controlling both motors so that upon the actuation of either motor, piston 71 is forced out of cylinder 70 by means of the solenoid valve and impinges against cover glass 75 to pivot the same upwardly.

While the preferred embodiment of the invention has been disclosed, it is to be understood that changes and variations may be made without departing from the spirit and scope of the invention.

I claim:

1. In combination with a standard microscope having a lens and stage and a film strip mounting a series of histological tissue specimens, an apparatus for handling said film strip which is adapted to present each of said tissue specimens to said microscope for viewing comprising:
   (a) a flat table having an opening therein and having a pair of downwardly and outwardly sloping support surfaces connected to said flat table along opposed peripheral edges, said flat table being mounted on said stage for movement in a given direction with said opening therein being beneath said lens;
   (b) a pair of reel support members securely mounted on respective support surfaces on opposite sides of said opening in said flat table, each of said reel support members including a pair of parallel and spaced apart, upright L-shaped supports mounted on said support surface, a pair of axially aligned stud members securely and respectively mounted on the exterior of said pair of L-shaped supports and extending inwardly through the same, a selected stud member including an axially extending opening and a hole radially extending from said opening to the periphery thereof and including a shaft rotatably mounted in said opening and having ends protruding therefrom, said shaft at one end being provided with an opening which axially extends into the same a distance, an annular groove extending around the periphery of said shaft with selected portions thereof being contiguous with said hole in said stud member, a passageway linking said annular groove with said shaft opening and a flexible nipple mounted on said selected end of said shaft and covering said opening therein, said nipple adapted to force air through said shaft opening, said shaft bore, said annular groove and out said radially extending stud hole, said other stud member being provided with an axially extending opening and a retractable spring loaded shaft residing in said opening;
   (c) a reel rotatably mounted on each of said reel support members and supported by the inwardly projecting ends of said shafts of said stud members, said reels adapted to windingly receive said film strip whereby said film strip defines a path between said reel support members, over said opening in said flat table and under said lens;
   (d) a cover glass residing on said flat table over said opening therein and having one edge pivotally connected to said flat table, said cover glass adapted to contact said film strip and to slightly press the same against said flat table; and
   (e) cover glass pivoting means comprising an air cylinder mounted on said flat table, a piston shaft being slidably received by said air cylinder and positioned for contact with said cover glass and tube means connected to and extending between said holes in said stud members whereby upon the manual gripping of either of said nipples, said piston shaft is extended and upwardly pivots said cover glass about its connection with said flat table thus freeing said film strip for movement along said path.

2. The apparatus of claim 1 wherein said flat table is mounted on said stage for movement in a given direction by means including a clamp securely and releasably attached to said stage and a bar securely and releasably attached to said flat plate, said bar having a groove running lengthwise in the same, a block member slidably mounted in said groove and securely connected to said clamp, said groove providing a track for said block member and means for moving said block means along said track whereby said flat table is moved relative said clamp in the direction of said groove.

3. In combination with a standard microscope having a lens and stage, an apparatus for handling a film strip which mounts histologic tissue specimens so that each of said tissue specimens may be presented to said lens to be viewed by said microscope comprising:
   (a) support means adjustably mounted on said microscope between the stage and lens thereof and comprising an integral rectangular sheet forming in the middle thereof a flat table having an opening therein in the area vertically below said lens and at the ends thereof a pair of downwardly and outwardly sloping support surfaces;
   (b) a pair of aligned reel support members mounted on said end support surfaces, each reel support member including a pair of parallel and spaced apart, upright and L-shaped supports rigidly mounted on the respective said support surface;
   (c) a reel provided for and rotatably mounted on each reel support member and adapted to windingly receive said film strip, said film strip defining a path between a pair of said reels which path extends over said opening in said support means and under said lens;
   (d) a cover glass mounted on said support means and extending across said opening therein, said cover glass being adapted when lowered to contact said film strip and to slightly press the same against said support means;
   (e) pneumatic means mounted on said support means for lifting said cover glass out of contact with said film strip upon the rotation of said reel means; and
   (f) a pair of axially aligned stud members respectively mounted on each pair of said L-shaped supports and including portions extending inwardly through the same adapted to releasably and rotatably receive one of said reels therebetween and other portions extending outwardly providing finger grips enabling said reels to be turned, one selected stud being provided with a concentric shaft which extends through the axial center thereof, said shaft at one end being provided with an axially aligned opening, an annular groove extending around the periphery of said shaft, a passageway linking said annular groove with said shaft opening and a nipple mounted on the end of said shaft and covering said opening therein, said nipple being adapted to force air through said opening and said passageway into said annular groove, and said stud being provided with a hole perpendicularly arranged with respect to the axis thereof and extending inwardly from its surface into pneumatic communication with said annular groove whereby the air being forced into said annular groove is directed outwardly through said hole in said stud and conduit means connecting said hole and said pneumatic cover lift means whereby said nipple is adapted to energize said cover lift means.

4. The apparatus of claim 3 wherein said cover glass is pivotally connected at one end to said flat table and is supported by said means for lifting said cover glass at the other end whereby upon the energization of said means for lifting said cover glass, said cover glass is pivoted upwardly a distance through an arc to allow said film strip to slide thereunder.

5. The apparatus of claim 4 wherein said means for lifting said cover glass is comprised of an air cylinder mounted on said flat table, a piston shaft being slidably received by said air cylinder and in supporting contact with said cover glass and tube means connected to and extending between said air cylinder and holes in said stud members whereby upon the manual gripping of either of said nipples, said piston shaft is extended and upwardly pivots said cover glass about its connection with said flat table.

6. The apparatus of claim 5 wherein a selected stud member of said reel support member is provided with a spring-loaded shaft which extends axially along the center thereof and is adapted to engage and rotatably support one side of said reel means and in cooperation with the opposed stud member is adapted to receive reel means of various widths.

7. In combination with a standard microscope having a lens and stage, an apparatus for handling a film strip which mounts histologic tissue specimens so that each of said tissue specimens may be presented to said lens to be viewed by said microscope comprising:
 (a) support means adjustably mounted on said microscope between the stage and lens thereof and comprising an integral rectangular sheet forming in the middle thereof a flat table having an opening therein in the area vertically below said lens and at the ends thereof a pair of downwardly and outwardly sloping support surfaces;
 (b) a pair of aligned reel support members mounted on said end support surfaces each said support member mounting a pair of opposed stud members each having inwardly extending portions adapted to releasably receive and to rotate a reel therebetween, and each having outwardly extending portions providing a finger grip enabling said reel to be turned, one stud member of each pair further mounting a compressible nipple adjacent its respective said finger grip, and conduit means connected to said nipple so arranged that with one hand manual compression of said nipple to force air into said conduit may be accomplished simultaneous with gripping of said finger grip for turning said reel;
 (c) a reel mounted on each respective support member providing a pair of reels adapted to receive said film strip, said strip defining a path between said reels extending over said opening and under said lens;
 (d) a cover glass pivotally mounted on said support means and extending across said opening therein, said cover glass being adapted when lowered to contact said film strip, to slightly press the same against said table and to optically correct said lens; and
 (e) pneumatic lift means mounted on said support means proximate the free end of said cover glass and connected to both of said nipple conduit means, said pneumatic lift means upon compression of said nipple on either respective stud member mounting such nipple being adapted to tilt said cover allowing the free movement of said strip thereby enabling either hand of the operator to be employed simultaneously on a respective finger grip and nipple.

References Cited
UNITED STATES PATENTS

| | | | |
|---|---|---|---|
| 2,123,882 | 7/1938 | Draeger | 350—241 X |
| 2,637,244 | 5/1953 | McLeod | 350—90 |
| 2,659,267 | 11/1953 | Baule | 40—86 |
| 2,800,733 | 7/1957 | Chevillon | 40—31 |
| 3,229,396 | 1/1966 | Shaw | 40—86 |

DAVID SCHONBERG, *Primary Examiner.*

R. GILLIAM, *Assistant Examiner.*

U.S. Cl. X.R.

350—86; 40—86